June 6, 1972  R. S. SHRYOCK  3,667,799
CAMPER KITCHEN AND UTILITY TRAILER
Filed April 20, 1971  2 Sheets-Sheet 1
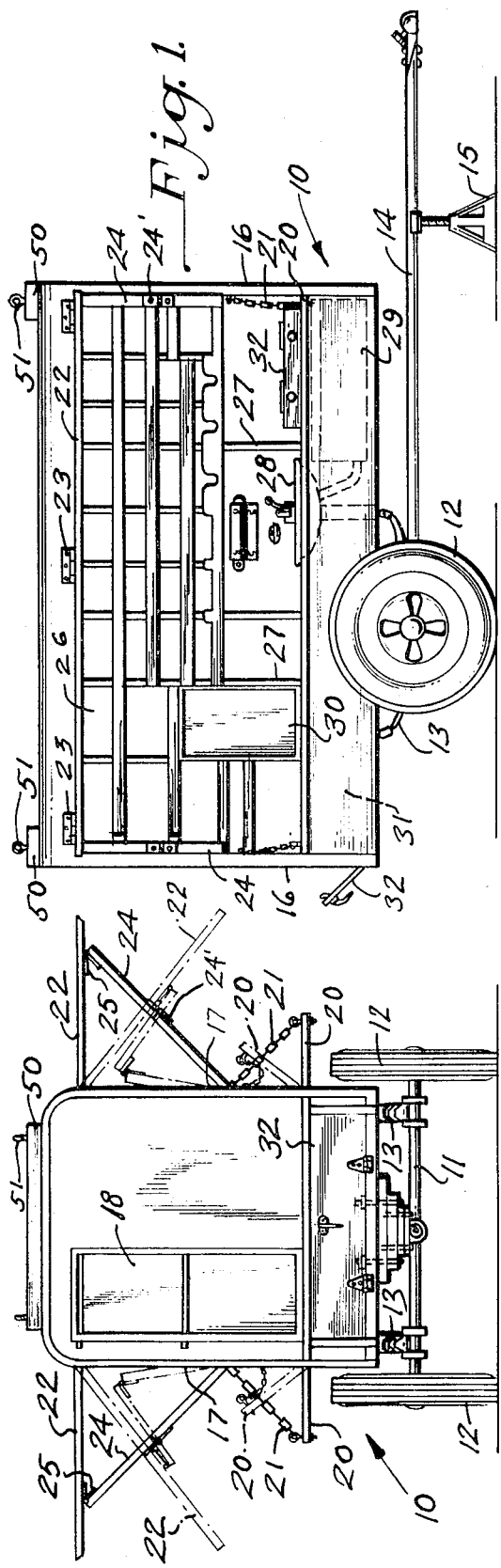
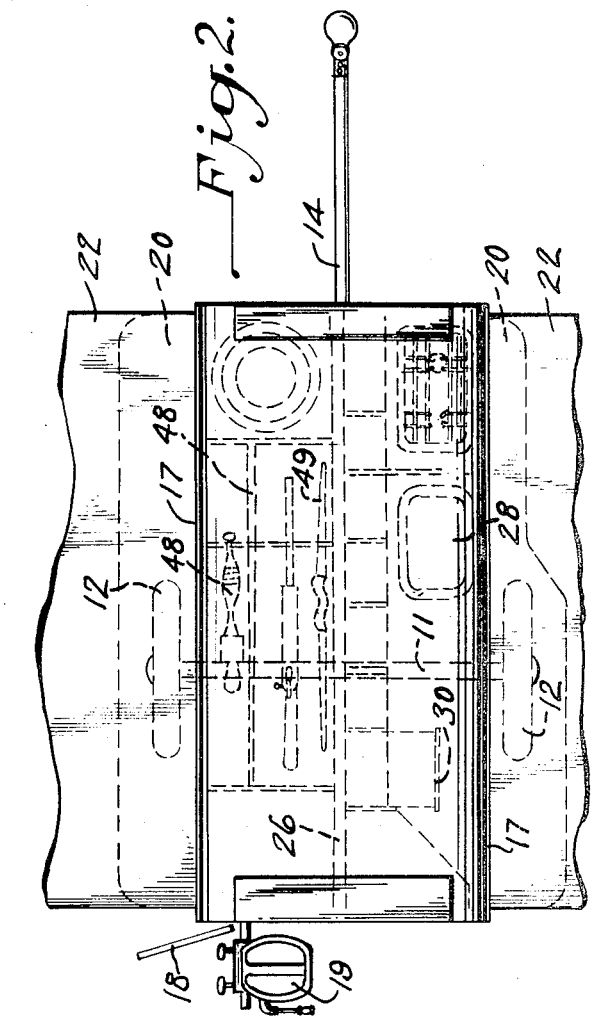
INVENTOR.
ROBERT S. SHRYOCK

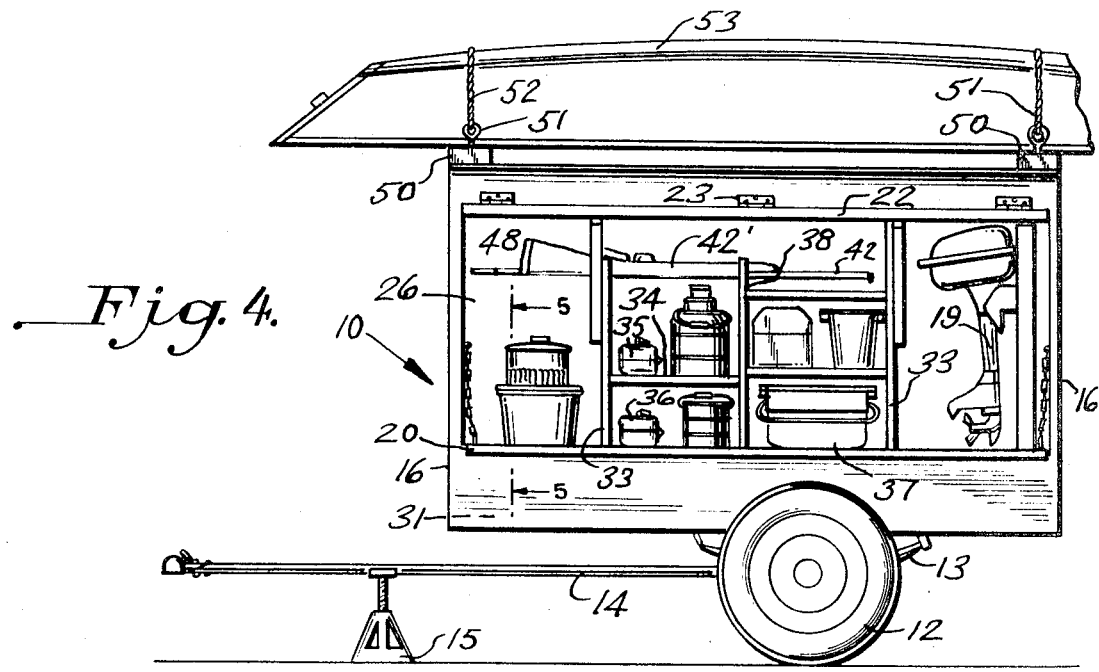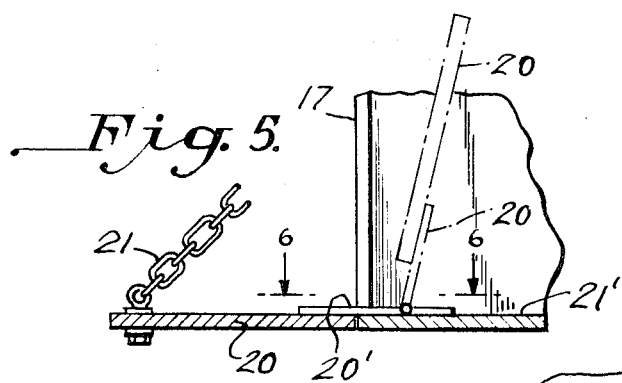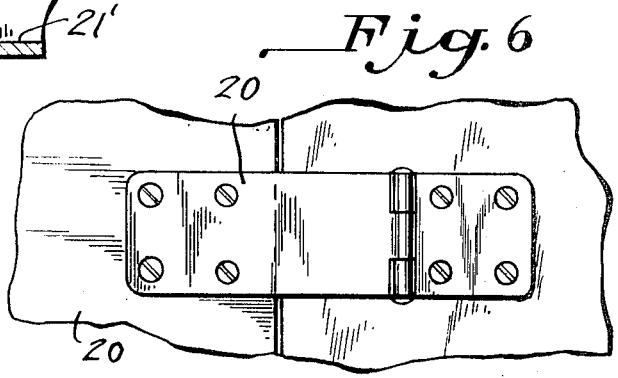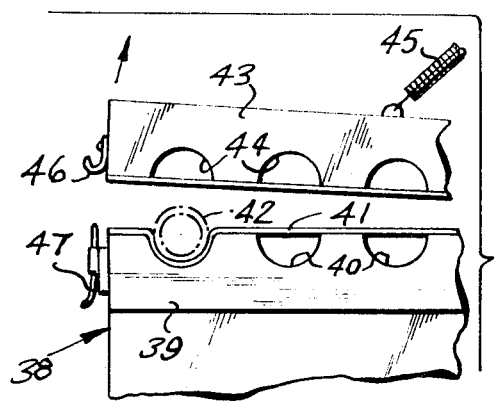

United States Patent Office 3,667,799
Patented June 6, 1972

3,667,799
CAMPER KITCHEN AND UTILITY TRAILER
Robert Stanley Shryock, 43 E. Guada Coma Drive,
New Braunfels, Tex. 78130
Filed Apr. 20, 1971, Ser. No. 135,660
Int. Cl. B60p 3/32
U.S. Cl. 296—23 B                                4 Claims

ABSTRACT OF THE DISCLOSURE

A trailer for camping, including partitions and shelving for the placement of utilities, chairs, bait, a sink and stove. The camper kitchen and utility trailer also provides means for guns, fishing tackle, an outboard motor, a refrigerator, and also provides shelter means.

---

This invention relates to trailers, and more particularly to a camper kitchen and utility trailer.

It is therefore the primary purpose of this invention to provide a trailer which will have kitchen facilities such as a sink, a burner, a refrigerator and storage means for various items used in camping.

Another object of this invention is to provide a trailer fold-down shelves for the placement of food and the sides upwardly folding panels which will serve as shelter means for the camper using the trailer.

Another object of this invention is to provide a trailer which will have accommodations for fishing rods, guns, and an archery bow and a divider wall within the trailer will serve to separate one side of the trailer from the side serving as a kitchen.

A further object of this invention is to provide a trailer which will have compartment means which will swing out on a door at one end wall of the trailer and the upper portion of the trailer will include rack means for tying down a cold pack ice chest.

Other objects of the present invention are to provide a camper kitchen and utility trailer which is simple in design, inexpensive to manufacture, rugged in construction, easy to use and efficient in operation.

These and other objects will be readily evident upon a study of the following specification together with the accompanying drawings wherein:

FIG. 1 is side view of the present invention showing the shelf portions lowered and the upper side panels raised for protection against the elements;

FIG. 2 is a fragmentary top plan view of FIG. 1;

FIG. 3 is a rear end view of FIG. 1;

FIG. 4 is a reverse side view of FIG. 1;

FIG. 5 is an enlarged view taken along the line 5—5 of FIG. 4;

FIG. 6 is an enlarged view taken along the line 6—6 of FIG. 5; and

FIG. 7 is a fragmentary and enlarged side face view showing the gun and fishing rod rack of the invention.

According to this invention, a camper kitchen and utility trailer is shown to include a single axle 11 having a pair of wheels 12. Secured to axle 11 is a pair of leaf springs 13. Secured fixedly to the underside of trailer 10 is a tow bar 14 which is supported upon a jack 15 in order to maintain trailer 10 level.

Trailer 10 is provided with a pair of parallel spaced apart end walls 16 and parallel spaced apart side walls 17, one of which includes a door 18 to which is releasably secured an outboard motor.

On each side of trailer 10 is a fold-down shelf near the lower extremity of trailer 10, shelves 20 serving as a means for resting food and other items on.

A chain 21 is secured to shelves 20 at either side and the opposite ends of chains 21 are secured fixedly to the inside surfaces of end walls 16. Shelves 20 are pivotable by means of hinges 20' which are secured at one side to shelves 20 and at the other side to partition 21'.

Near the upper extremity of side walls 17 is a hinged panel 22, one on either side of trailer 10, the panels 22 serving as shelter means for the users of trailer 10. A plurality of hinges 23 are secured to shelter panels 22 at one end and are secured at the other ends to the side walls 17.

A pair of foldable braces 24 are secured to a hinge 25 attached to shelter panels 22 and the opposite ends of braces 24 are pivotably secured to the end walls 16 of trailer 10.

Trailer 10 is also provided with a divider wall 26 which operates the kitchen portion from the opposite side of trailer 10.

A plurality of spaced apart partitions 27 provide compartment means for the various kitchen components, such as sink 28 which is supplied with water from tank 29 in the lower extremity of trailer 10.

A refrigerator 30 is also included within the kitchen portion of trailer 10 and the water tank 29 is stationary within the lower compartment 31 at one end of trailer 10. Access to compartment 31 is accomplished by a fold-down gate member 32 which allows for the receiving of oars, stakes and the like within the compartment 31.

A plurality of partitions 33 and shelves 34 on the opposite side of divider wall 26, provides storage means for a bait box 35, a tackle box 36, an ice chest 37 and other asundered items.

A gun rack 38 is secured to the upper extremity of the partitions 33 and includes a base portion 39 having cut-outs 40. Secured fixedly over the cut-outs 40 is a strip of elastic material 41 which is depressed into the cut-out 40 that the gun barrel 42 is received in. A hinged member 43 matingly engages with base portion 39 of gun rack 38 and includes spaced apart cut-outs 44 which when rack 38 is closed, will retrain gun barrel 42.

Also secured to the pivotable member 43 is a spring 45 which urges member 43 upwards when the latch portions 46 and 47 are opened in order that the user will have ready access to the gun 42'.

Trailer 10 also provides storage means for fishing rods 48. A pair of parallel spaced apart rails 50 are fixedly secured to the top side of trailer 10 and are provided with eye 51 means for securing a rope 52 or the like for rendering a boat 53 stationary thereon.

What I claim is:

1. A camper kitchen and utility trailer, comprising, a pair of parallel spaced side walls, and a pair of parallel spaced end walls, a bottom wall and a top wall, an axle carried by said trailer with wheel means for supporting it in rolling and standing engagement with the ground, a central partition carried by said trailer for dividing the kitchen portion from the opposite side, a pair of fold-down shelves carried by said trailer providing resting means for food and utensils, a pair of upwardly folding shelter panels carried by said trailer with foldable brace means, a door carried by said trailer for having access to an outboard motor mounted thereon, a gun and fishing rod rack carried by said trailer with retaining means and latch means for securing said guns, fishing rods and the like, stove, sink, and refrigerator means carried by said trailer with shelves and partitions providing storage space for items, rail means carried by said trailer for securely mounting a boat on said trailer.

2. The combination according to claim 1, wherein said trailer is provided with tow bar means for transporting said trailer behind a vehicle and said tow bar is raised by jack means in order to level said trailer when it is in use and said shelves fold outwards from the side walls of said trailer for the placement of food and utensils thereon, said shelves extending outwards from a partition which divides said trailer so that it has a lower compartment, said lower compartment having a fresh water tank therein for supplying said sink which has drain means through the bottom wall of said trailer and a stove member is positioned above said lower partitioned wall adjacent to said sink and chain means is secured to one end of said shelves on both sides, the opposite end being secured fixedly to the inside surface of the end walls of said trailer and said shelter panels are pivotable upwards from said side walls by hinge means secured thereto and hinge means secured to the outer extremity of said panels are secured at their opposite ends to foldable brace members which serve to render said shelter panels stationary in order to provide shelter for the users of said trailer and the lower end of said braces is secured pivotly to the inside surfaces of said walls of said trailer.

3. The combination according to claim 2, wherein one of said end walls includes said door, said door being the mounting means for an outboard motor, and when said door is opened outwards said outboard motor pivots in order that it may be easily removed therefrom and the lower portion of said trailer which carries said water tank includes compartment means towards the rear of said trailer for the storing of oars, stakes and the like and access to said compartment is effected by unlatching and lowering a rear gate member, said gate member being hingeably secured thereto and shelving within said kitchen portion of said trailer includes vertical partitions for defining compartments for the storage of utensils, food and the like and the opposite side of the central partition running longitudinal with said trailer provides separation means for said kitchen portion and the storing of camping items for fishing and the like.

4. The combination according to claim 3, wherein partions towards the center of one side of said trailer which comprises the camper storage area, includes said gun rack, the base portion of said gun rack having spaced apart and semi-circular cut-outs, said cut-outs being covered over by an elastic material which is fixedly secured by adhesive or other means to the upper side of said base of said gun rack and when the barrel or fishing rod is placed in one of said cut-outs it urges said elastic material down into said cut-outs and affords protection for said barrel and said fishing rod and the upper portion of said gun rack includes a hinged bar member having similar cut-outs for mating engagement with said cut-outs of said base and said hinged portion also includes a similar elastic strip affording protection means for said barrel of said gun or fishing rod and said upper portion also includes spring means attached thereto for aiding in opening said gun rack when latch members are unlocked at the far end of said gun rack and said compartment affording storage for said guns and rods also provides storage means for an archer's bow and a roof portion of said trailer includes said rail members, which are parallel spaced apart and include eye members therein for the attachment of ropes and the like for rendering secure, a boat.

References Cited
UNITED STATES PATENTS

| | | | |
|---|---|---|---|
| 2,845,663 | 8/1958 | Harr | 296—23 B |
| 3,527,496 | 9/1970 | Gilligan | 296—23 R |

PHILIP GOODMAN, Primary Examiner

U.S. Cl. X.R.

296—24 A